(12) United States Patent
Taylor

(10) Patent No.: US 6,467,025 B1
(45) Date of Patent: Oct. 15, 2002

(54) CACHE MEMORY SYSTEM AND METHOD UTILIZING DOUBLY-LINKED LOOP OF CACHE LINES AND A SINGLE POINTER TO ADDRESS A CACHE LINE IN THE DOUBLY-LINKED LOOP

(75) Inventor: James Leigh Taylor, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/519,344

(22) Filed: Mar. 6, 2000

(30) Foreign Application Priority Data

Mar. 11, 1999 (GB) .............................................. 9905480

(51) Int. Cl.$^7$ .............................................. G06F 12/10
(52) U.S. Cl. ............................ 711/118; 711/3; 711/128; 711/136; 711/160
(58) Field of Search .............................. 711/3, 118, 128, 711/136, 160

(56) References Cited

U.S. PATENT DOCUMENTS

| | | | |
|---|---|---|---|
| 4,636,946 A | | 1/1987 | Hartung et al. |
| 5,717,916 A | | 2/1998 | Verma ........................ 395/607 |
| 5,764,972 A | * | 6/1998 | Crouse et al. ................. 707/1 |
| 5,778,430 A | | 7/1998 | Ish et al. ..................... 711/133 |
| 5,875,352 A | * | 2/1999 | Gentry et al. ................. 710/23 |
| 6,216,198 B1 | * | 4/2001 | Baba ............................ 711/3 |

FOREIGN PATENT DOCUMENTS

WO     WO97/39407     10/1997

OTHER PUBLICATIONS

G. Michael Schmeider et al. "Concepts In Data Structure & Software Development" West Publishing Company, 1991, pp. 137–141.*

Weiss, Ray, *"Fast Cache Designs Keep the RISC Monster Fed,"* Computer Design, Jan. 1995; http://206468.2.242/Editorial/1995/01/Report/fast.html;05/03/99; pp. 1–6.

* cited by examiner

*Primary Examiner*—Do Hyun Yoo
*Assistant Examiner*—Mehdi Namazi
(74) *Attorney, Agent, or Firm*—Randall J. Bluestone; Bracewell & Patterson, L.L.P.

(57) ABSTRACT

An improved cache memory and method of operation thereof. The cache memory includes a doubly-linked loop of cache lines and a single pointer operable to address a cache line in the doubly-linked loop. In the cache memory, the pointer is preferably operable to address a next cache line in the doubly-linked loop, or a previous cache line in the doubly-linked loop. The cache memory as described permits a reduction in the number of instruction steps involved in controlling the cache lines. The improved cache memory may be implemented in a data processing system or within a computer program product.

14 Claims, 2 Drawing Sheets

CACHE MEMORY SYSTEM AND METHOD UTILIZING DOUBLY-LINKED LOOP OF CACHE LINES AND A SINGLE POINTER TO ADDRESS A CACHE LINE IN THE DOUBLY-LINKED LOOP

BACKGROUND OF THE INVENTION

1. Technical Field of the Invention

The present invention is concerned with a system, apparatus and method for controlling cache memory in a data processing system, and in particular to the provision of improved cache addressing in a data processing system. The present invention is of general applicability in data processing systems, and particularly where the speed at which data can be retrieved is of concern.

2. Description of the Related Art

In conventional computer systems, instructions and data are stored in main storage and fetched from main storage by a memory management system for execution or use by a central processor unit, or possibly by some special function unit, such as a floating-point processor. In some systems, some instructions and data may be retained after their use in a cache memory which can be accessed more quickly than the main storage, so that such instructions and data can be reused later in the execution of the same program. This improves the execution performance of the computer system by reducing the time taken to fetch the instructions and data for processing by the central processing unit.

In systems having caching, the number of cycles taken to retrieve an instruction or a data item depends on whether the instruction or data item is already in the cache or not, and on how many instructions are required to address or retrieve the instruction or data item. If the instruction or data item is not in the cache (a "cache miss"), the instruction or data item must be fetched from main memory, which consumes some number of instruction cycles. If the data item or instruction is in the cache, some instruction cycles will also be consumed, although they will be fewer than in the case of a cache miss. Nevertheless, any improvement that can be made in the processing of cached data and instructions is useful, and, in certain circumstances, may make a considerable difference to the processing performance of the system.

Improvements in cache memory performance have been sought utilizing various methods of linking and associating groups of cache lines. One example is the use of set-associative caching, wherein each cache line is placed in a logically appropriate set, and the addressing mechanism then locates first the set, and then the individual cache line within that set. In caches comprising simple set-associative mechanisms based on addressing, it is not necessary to store the full address in each cache line; part of the address can be deduced from the set association itself.

Another technique frequently used is a hash table. A hash table is, in effect, an abbreviated index to the cache lines, which reduces the average time taken in searching for an entry or in determining that the data is not present in the cache and will therefore need to be fetched from main memory.

There are also various techniques for arranging the contents of a cache memory. For example, the cache lines may be arranged as a linked list, in which each element except the last contains a pointer forward to the next element. An element can thus be located by following the chain of pointer references. A more sophisticated technique makes use of a doubly-linked list, in which each element except the last contains a pointer forward to the next element, and each element except the first contains a pointer backward to the previous element. The process of locating an element in such a structure can thus proceed either forwards or backwards along the chain of pointer references.

An attempt to solve the problems of cache management using hash tables and a least-recently-used cache line eviction technique is disclosed in U.S. Pat. No. 5,778,430, which also describes the use of linked lists and circular linked lists to improve the efficiency of searching for the least-recently-used cache line.

All the known techniques of organizing and addressing caches have disadvantages in terms of the numbers of instructions required to process them. Caches addressed using set-associative techniques and hash tables can still have problems in terms of the number of instructions required to process insertions, deletions and the initial addressing of a cache line. The known cache arrangements, such as linked lists and doubly-linked lists, require extra instructions to handle the various special cases, such as the case of an empty list, or the case of a deletion of a last cache line from a list.

SUMMARY OF THE INVENTION

It is therefore an object of the present invention to provide an improved data processing system.

It is another object of the present invention to provide an improved cache memory and method of operation thereof.

To achieve the foregoing objects, and in accordance with the invention as embodied and broadly described herein, an improved cache memory is disclosed. The cache memory includes a doubly-linked loop of cache lines and a single pointer operable to address a cache line in the doubly-linked loop. A doubly-linked loop, also sometimes called a circular doubly-linked list, is advantageously utilized to provide a set of efficient primitive operations for addressing and manipulating the cache lines.

In one embodiment of the present invention, the pointer is operable to address a next cache line in the doubly-linked loop. Alternatively, in another advantageous embodiment, the pointer is operable to address a previous cache line in said doubly-linked loop. In a related embodiment, the pointer is stored in a register.

In another embodiment of the present invention, the cache memory further includes cache lines having address data, a dirty marker and an empty marker arranged as a singly-loadable unit.

In a second aspect of the present invention, a data processing system includes a processor, a main memory and at least one cache memory having a doubly-linked loop of cache lines and a single pointer operable to address a cache line in the doubly-linked loop.

In one embodiment of the present invention, the data processing system further includes a plurality of cache memories and a hash table of entries for addressing the plurality of cache memories. Alternatively, in another advantageous embodiment, the data processing system further includes a plurality of cache memories and a set associative mechanism for addressing the plurality of cache memories. In a related embodiment, the data processing system further includes a pointer stored in a register of the processor.

In a third aspect of the present invention, a method for implementing a cache memory is disclosed. The method includes utilizing a doubly-linked loop of cache lines and employing a single pointer operable to address a cache line in the doubly-linked loop. To purge a cache line, the method further includes marking a current cache line as empty and clean. Next, a pointer is employed to point to a next cache line. To load an item into the cache line, the method further includes pointing a pointer to a cache line at a least-recently-used position. Thereafter, the item to be loaded is loaded from a memory into the cache line.

The present invention advantageously utilizes the simplified pointer manipulation operations available to a doubly-linked loop to give an improvement in code speed and compactness and to reduce code complexity. The present invention does not require the special-case processing that is necessary in typical previously-existing solutions to the problems of cache memory control.

The advantage of a loop over a list is the increased symmetry. With a list, it is necessary to do special processing when you reach an end, whereas loops do not have ends, and thus the special processing is not necessary. The anchor structure for a doubly linked loop is a simple pointer, for example, to the head position. The anchor structure for a doubly-linked list is two pointers—one to the head position and one to the tail position. The extra pointer is necessary because the "prev" pointer of the head element and the "next" pointer of the tail element are not used to hold useful information.

With a loop it is possible to step from the "tail" to the "head" without additional overhead. With a doubly-linked loop it is possible to go either way. Hence it is easy to make the "tail" element the new "head" element merely by stepping the "head pointer" one step back. It is not necessary to physically remove the tail element and prepend it to the head (that is, it is not necessary to break and remake any of the links). Similarly, it is possible to logically move the head element to the tail position by a simple forward step of the "head pointer"

It typically costs one processor instruction to step a pointer one position around the loop. The cost of removing an element and reinserting it elsewhere in the list is considerably higher.

Doubly-linked loops also have the same advantage as doubly-linked lists: it is easy to remove an element from the list. However, the overhead for adding an element to the list is higher than for a single-linked loop because there are more link pointers to update.

The present invention organizes cache lines into a doubly-linked loop structure in such a way that the single step primitive is efficiently used. Examples include promoting an unused (or LRU but occupied) cache line to the head position prior to filling it, or demoting a newly purged cache line from the head position. Additionally because the anchor structure is a single pointer, it is easier to hold it in a register within the processor for efficient operation.

Additionally the invention makes use of certain specializations of the double linked loop, most notably that there is more than one cache line within the cache. Thus, when moving a random cache line to the head position, it can be assumed that the loop will be non-empty after the removal of the cache line from its original position prior to insertion into its new position. This removes the need for code to handle the empty case, making the code simpler and faster.

The foregoing description has outlined, rather broadly, preferred and alternative features of the present invention so that those skilled in the art may better understand the detailed description of the invention that follows. Additional features of the invention will be described hereinafter that form the subject matter of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

A preferred embodiment of the present invention will now be described by way of example, with reference to the accompanying drawings, in which.

DETAILED DESCRIPTION

Figure 1:
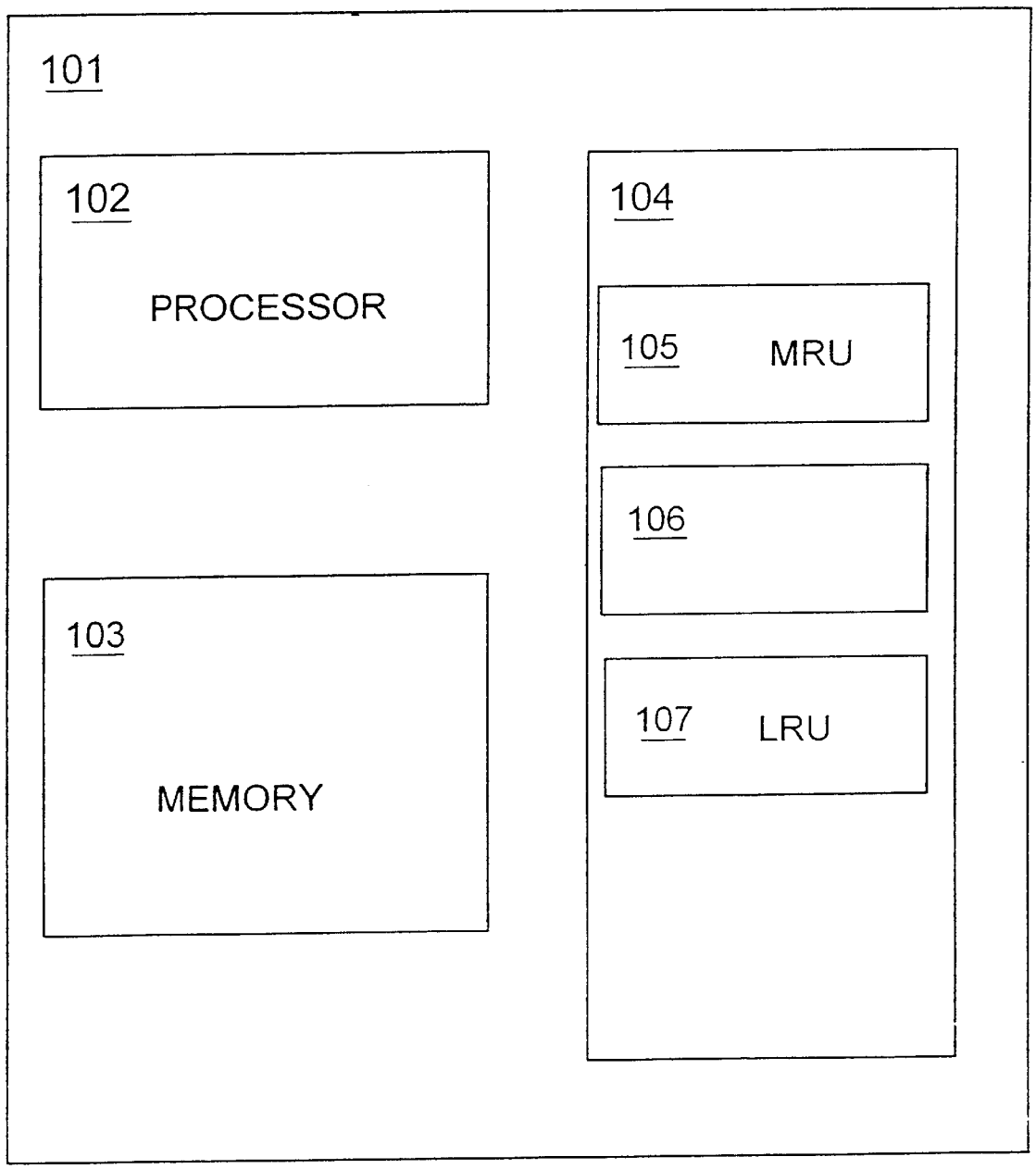
FIG. 1 is a block diagram of an exemplary computer system having a cache memory according to the present invention.

In FIG. 1, a computer system 101 includes a processor 102 and a storage 103, which may represent main memory or an external data storage device, such as disk storage, optical storage, tape storage or similar storage devices. The computer system also includes a cache memory 104 having a plurality of cache lines, designated 105, 106 and 107. Only three of the plurality of cache lines are shown; in practice there may be a large number. In the illustrated figure, cache line 105 represents the most-recently-used (MRU) cache line, and cache line 107 represents the least-recently-used (LRU) cache line. As in any computer system having cache memory, the processor 102 may make a request for data. The cache memory mechanism is capable of searching the contents of the cache memory for the presence of a particular requested data item. The various searching means are well-known in the art, and may include the use of hash tables, set-associative searching means, and the like. If the searching means determines that the required data item is not contained in the cache memory, the computer system retrieves the data item from storage 103.

Figure 2:
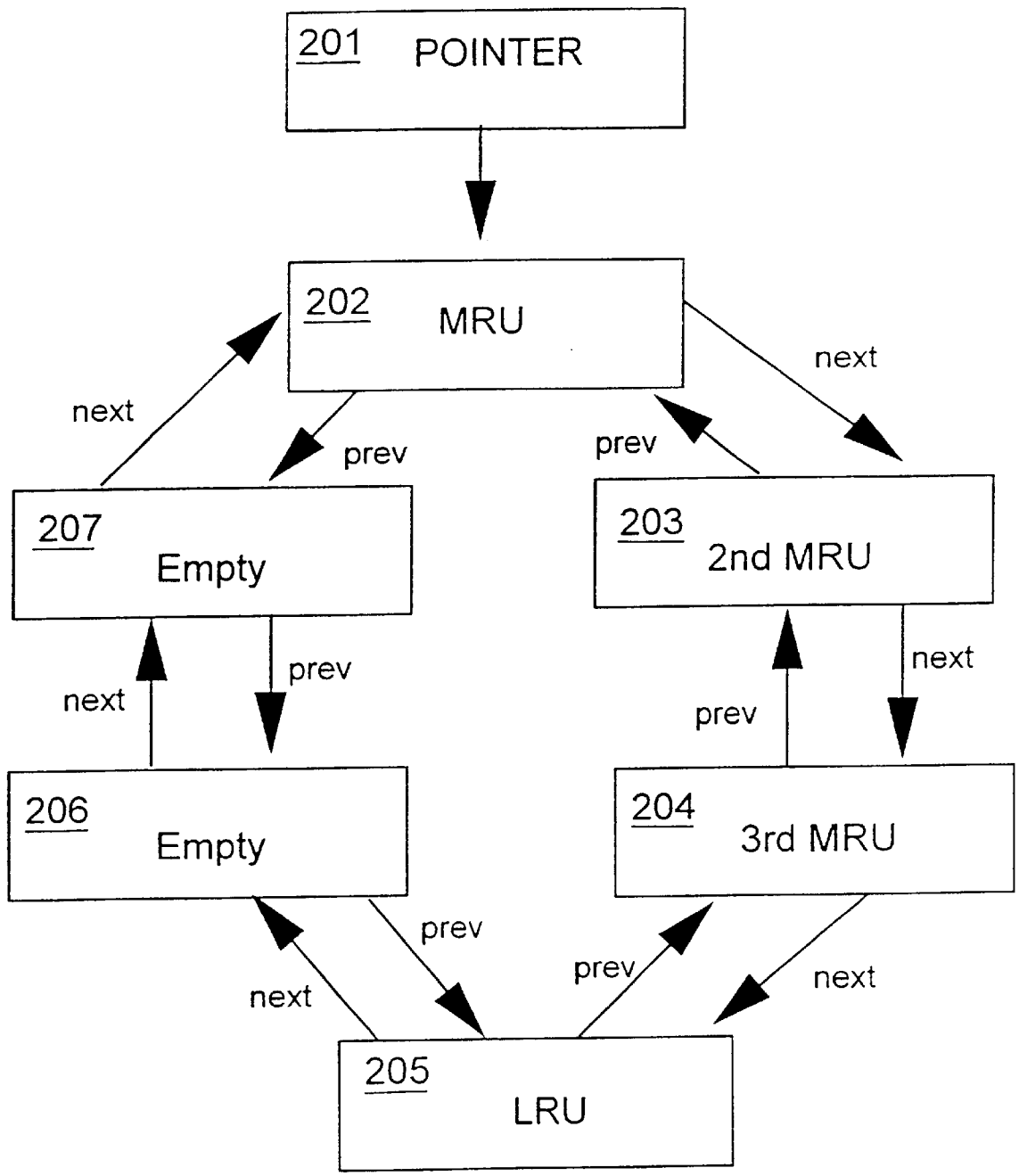
FIG. 2 is a detailed diagram of an embodiment of a cache memory according to the present invention.

Referring now to FIG. 2, there is depicted an embodiment of a cache memory according to the present invention in which a pointer 201 points to a most-recently-used cache line 202. Each cache line 202, 203, 204, 205, 206, 207 has associated forward (next) and backward (prev) pointers to the respective next and previous cache lines. It can be seen in the illustrated figure that the pointer operations that set the pointer to "next" or "prev" have the effect of, as it were, "rotating" the doubly-linked loop in either a counterclockwise or a clockwise direction.

The cache comprises a single pointer "ptr" 201 and a doubly-linked loop (that is, a doubly-linked list connected as a loop) of a number of cache lines. The pointer "ptr" 201 is the fundamental base pointer for accessing the data in the cache line. Doubly-linked loops are well-adapted for the removal and insertion of list elements from or to any arbitrary position in the list. The doubly-linked loop is a very symmetrical structure with no start or end, which eliminates certain special case tests for the boundary conditions. During operation the loop is never empty, which again simplifies the code because the empty case never arises The system implements a strict Least Recently Used (LRU) cache: if it is necessary to flush a cache line to make way for a new entry, the line that is flushed will be the one that was least recently used. In the illustrated embodiment, each cache line contains the following information:

1. A pointer to the previous entry in the loop—"prev".
2. A pointer to the next entry in the loop—"next".
3. A boolean flag to indicate whether the cache line is empty—"empty". If the cache line is not empty it is said to be full. Another possible representation of this flag is the address being set to a reserved value, for example 0.
4. A boolean flag to indicate whether that cache line is dirty—"dirty". A cache line is dirty if its contents have been updated locally and hence may not match the corresponding data in external storage. If the cache line is not dirty, it is said to be clean.
5. The external address of the cached item—"address".
6. The data for the cached item—"data". The contents of data are application dependent.

An additional optimization may be obtained by combining items 3, 4 and 5 from the above list in a single loadable and writeable element, or "word". This advantageously permits the information to be compressed and exploits the difference in processing time taken to perform the initial load of a word containing an address and the time taken to perform subsequent processing on the same word: the initial loading is slower than subsequent processing using, for example, masking and comparison instructions. Thus a single load, in this case, makes the three items of information available at a lower processing cost than would be the case if they were stored as separate items. Similarly advantageously, a single store instruction can be used to write the three items of information.

At initialization, each cache line is set to empty and clean, and the "prev" and "next" pointers initialized such that the cache lines form a doubly-linked loop. The pointer "ptr" 201 is set to point to an arbitrarily chosen cache line. The pointer "ptr" 201 always points to the "current" entry in the cache. This will either be empty (in which case the entire cache is empty), or by definition must be the most recently used "MRU" entry in the cache. Following the loop round in the "next" direction leads to successively less recently used entries, and then 0 or more empty cache lines. The ordering of the set of empty cache lines in the latter part of the loop is not important. FIG. 2 illustrates an exemplary state of the cache with a number of full lines and two empty line.

The construct "ptr->prev" is the address of either an empty cache line, or the least recently used "LRU" entry in the cache. The cache line pointed to by "ptr" is designated the most-recently-used (MRU) position and the cache line pointed to by "ptr->prev" is designated the least-recently-used (LRU) position, although the cache line at that position may, in fact, be empty. The cache is empty if and only if the cache line in the MRU position is empty. The cache is full if and only if the cache line in the LRU position is full.

In the cache memory of the preferred embodiment, the following operations are available:

1. Make a "target" cache line the current cache line. If "target" is already the current line, then there is nothing to do. If it is not, remove "target" from its position in the loop. Insert "target" into the loop before the current line pointed to by "ptr". Perform the assignment "ptr=target",which has the effect of pointing "ptr" at "target".
2. Purge the current cache line. Mark the current cache line as empty and clean. Perform the assignment "ptr=ptr->next",which has the effect of moving the now empty cache line to the LRU position; all the other cache lines move counterclockwise one position.
3. Flush the current cache line. If the cache line is full and dirty, then write the data it contains back to external storage. Purge the current cache line as above.
4. Get an entry into the cache. Search the cache sequentially in the "next" direction starting at the MRU position until one of the following occurs:
    a) The entry is found in the cache ("cache-hit"), in which case we make that cache line the current cache line as above.
    b) An empty cache line is found ("cache-miss"), in which case we load the entry as a new item into the cache as below. In this case, it is not necessary to flush the cache line in the LRU position.
    c) The search process has iterated right round the loop ("cache-miss"), in which case we load the entry as a new item into the cache as below. In this case, it is necessary to flush the cache line in the LRU position.
5. Load a new item into the cache (cache-miss). Perform the assignment "ptr=ptr->prev", which has the effect of moving the cache line at the LRU position to the current position, and moving the other cache lines clockwise one position. If the current cache line is full and dirty, write the data it contains back to external storage. This is the case where the cache is completely full so the system frees up the LRU cache line for reuse. Load the relevant data from external storage to the current cache line. Update the address of the current cache line. Mark the current cache line clean. Mark the current cache line full. (In the case where the address, dirty marker and empty marker are combined in a single word, these last three steps can be achieved using a single store instruction.)
6. Flush the entire cache. While the current cache line is full, flush the current cache line as above and iterate.

The described embodiment is of particular usefulness in implementing a cache memory control mechanism in software. In this area, a typical implementation might keep a number of different lists (for example, empty cache lines and full cache lines could be kept on different lists), and the software might have to go through a number of special case checks.

In the present embodiment, the use of a doubly-linked loop provides a useful set of fast primitive operations that coincide well with the requirements for the implementation of a software cache. For example when a new cache line is required, the operation "ptr=ptr->prev" has the effect of moving the referenced cache line into the current position at the same time as moving all the other cache lines one position clockwise. This operation makes the correct cache line current, whether or not it is already full. In a typical previously-existing solution, the correct cache line would either be the head element of the list of empty cache lines, or otherwise the tail element of the list of full cache lines (if the list of empty cache lines is empty). The code would therefore be slower.

Similarly when a cache line is flushed or purged it would be moved from the list of full cache lines to the list of empty cache lines. In the present embodiment, the operation "ptr=ptr->next" will achieve the corresponding operation more quickly.

The key control structure is a single pointer "ptr". In an advantageous embodiment, it is possible to hold this pointer permanently in a register internal to the processor for further increased speed of operation. A typical previously-existing solution may maintain a number of structures such as lists, the key control structures of which would not be held permanently in registers internal to the processor.

The list operations in a typical previously-existing solution are slow because they contain conditional paths relating to the empty cases. For example, moving a cache line between lists would involve checks for the source list becoming empty and the destination list being originally empty. In the present invention there is only one list (a doubly-linked loop) which can never become empty so these cases do not arise.

The present invention can be extended by known techniques. For example, if it is desired to build a fast large cache, a hash table may be inserted, each entry of which references an instance of the present invention. A cache operation then consists of identifying the correct hash table entry, followed by the relevant cache operation on the said entry according to the invention.

The present invention may be embodied in other specific forms without departing from its spirit or essential characteristics. The described embodiments are to be considered in all respects as illustrative and not restrictive. The scope of the invention is, therefore, indicated by the appended claims rather than by the foregoing description. All changes which come within the meaning and range of equivalency of the claims are to be embraced within their scope.

What is claimed is:

1. A cache memory comprising:
    a plurality of cache lines having address data, dirty marker and empty marker arranged as a singly loadable and writeable unit, wherein said plurality of cache lines is organized as a doubly-lined loop; and
    a single pointer operable to address a cache line in said doubly-linked loop.

2. The cache memory as recited in claim 1, wherein said single pointer being operable to address a next cache line in said doubly-linked loop.

3. The cache memory as recited in claim 1, wherein said single pointer being operable to address a previous cache line in said doubly-linked loop.

4. The cache memory as recited in claim 1, wherein said single pointer is stored in a register.

5. A data processing system comprising:
    a processor;
    a main memory; and
    at least one cache memory including:
        a plurality of cache lines having address data, dirty marker and empty marker arranged as a singly loadable and writeable unit, wherein said plurality of cache lines is organized as a doubly-linked loop; and
        a single pointer operable to address a cache line in said doubly-linked loop.

6. The data processing system as recited in claim 5, wherein said single pointer is stored in a register of said processor.

7. The data processing system as recited in claim 5, further comprising a plurality of cache memories and a hash table of entries for addressing said plurality of cache a memories.

8. The data processing system as recited in claim 5, further comprising a plurality of cache memories and a set associative mechanism for addressing said plurality of cache memories.

9. A method of implementing a cache memory, comprising the steps of:
    utilizing a doubly-led loop of cache lines;
    employing a single pointer operable to address a cache line in said doubly-linked loop; and
    purging a cache line in said cache memory, including:
        marking a current cache line as empty and clean; and
        pointing said single pointer to a next cache line.

10. The method as recited in claim 9, further comprising the step of loading an item into said cache memory, said step of loading an item including the steps:
    pointing said single pointer to a cache line at a least-recently-used position; and
    loading said item from a memory into said cache line.

11. The method as recited in claim 9, further comprising the step of storing said single pointer in a register.

12. A computer program product, comprising:
    a computer-readable recording medium having stored thereon computer executable instructions for implementing a cache memory, said computer executable instructions when executed, perform the steps of,
    utilizing a doubly-linked loop of cache lines;
    employing a single pointer operable to address a cache line in said doubly-linked loop; and
    purging a cache line including:
        marking a current cache line as empty and clean; and
        pointing said single pointer to a next cache line.

13. The computer program product as recited in claim 12, further comprising the step of loading an item into said cache memory, said step of loading an item including the steps:
    pointing said single pointer to a cache line at a least-recently-used position, and
    loading said item from a memory into said cache line.

14. The computer program product as recited in claim 12, further comprising the step of storing said single pointer in a register.

* * * * *